United States Patent [19]

Fan et al.

[11] Patent Number: 4,618,647

[45] Date of Patent: Oct. 21, 1986

[54] PROCESS FOR PRODUCING A POLYMER WATER-IN-OIL EMULSION

[75] Inventors: You-Ling Fan, East Brunswick; George L. Brode, Somerville, both of N.J.; Meyer R. Rosen, Spring Valley, N.Y.

[73] Assignee: Union Carbide Corp., Danbury, Conn.

[21] Appl. No.: 674,951

[22] Filed: Nov. 26, 1984

Related U.S. Application Data

[63] Continuation of Ser. No. 474,420, Mar. 11, 1983, abandoned.

[51] Int. Cl.$^4$ .................................................. C08F 2/32
[52] U.S. Cl. ........................................................ 524/801
[58] Field of Search ......................................... 524/801

[56] References Cited

U.S. PATENT DOCUMENTS

| | | | |
|---|---|---|---|
| 3,284,393 | 11/1966 | Vanderhoff et al. | 526/287 |
| 3,414,547 | 12/1968 | Thompson et al. | 526/229 |
| 3,920,599 | 11/1975 | Hurlock et al. | 524/801 |
| 3,996,180 | 12/1976 | Kane | 524/801 |
| 3,997,492 | 12/1976 | Kane et al. | 524/801 |
| 4,070,321 | 1/1978 | Goretta et al. | 524/801 |
| 4,363,886 | 12/1982 | Lipowski et al. | 524/801 |
| 4,379,883 | 4/1983 | Zecher | 524/801 |
| 4,419,483 | 12/1983 | Yanutola | 524/801 |
| 4,439,580 | 3/1984 | Schaper | 524/801 |
| 4,485,209 | 11/1984 | Fan et al. | 524/801 |
| 4,521,552 | 6/1985 | Schnee et al. | 524/801 |

OTHER PUBLICATIONS

Frank Di Stefano, "Inverse Emulsion Polymerization of Acrylamide; A Mechanistic Study", Lehigh University Master's Thesis, Nov. 1981.

*Primary Examiner*—Paul R. Michl
*Assistant Examiner*—Alex H. Walker
*Attorney, Agent, or Firm*—Henry H. Gibson

[57] ABSTRACT

A process for the water-in-oil emulsion polymerization of at least one ethylenically-unsaturated monomer is disclosed wherein a water-in-oil emulsion of said monomer is polymerized in the presence of a first, highly reactive polymerization initiator until a small amount of polymer is present sufficient to provide a shear-stable emulsion, followed by completing the polymerization in the presence of a second, less reactive polymerization initiator.

29 Claims, No Drawings

PROCESS FOR PRODUCING A POLYMER WATER-IN-OIL EMULSION

This application is a continuation of prior U.S. application Ser. No. 474,420, filed Mar. 11, 1983, now abandoned.

BACKGROUND OF THE INVENTION

This invention relates to a process for producing a polymer water-in-oil emulsion; and more particularly and in a preferred embodiment, to a process for producing a water-in-oil emulsion of a linear, high molecular weight polymer.

Water-in-oil emulsion polymerization processes, in which a water-soluble monomer is emulsified in an oil phase and polymerized therein, are well known in the art. For example, U.S. Pat. No. 3,284,393 describes such a process wherein water-soluble monomers are polymerized to high molecular weight polymers or copolymers utilizing a water-in-oil emulsion polymerization procedure. In the polymerization process described in said patent, one or a plurality of water-soluble monomers, or an aqueous solution thereof, are emulsified in an oil phase by means of a water-in-oil emulsifier and emulsion polymerized under free radical forming conditions to form a polymeric latex in which the oil phase is the dispersion medium.

A water-in-oil emulsion of a polymer is produced by such a water-in-oil emulsion polymerization process, from which may be formed an aqueous solution of such polymer by inverting the emulsion with an inverting surfactant. Such "inverse emulsion polymerization" processes are an important part of the commercial production of certain types of water-soluble polymers where a liquid containing a high concentration of polymer is desired. For example, many anionic polymeric flocculants are high molecular weight, water-soluble polymers. The water-in-oil emulsion polymerization route to such polymers is the most significant commercially viable method that provides a liquid product containing a high loading (concentration) of such polymers. A liquid product is preferred in commercial flocculation for its ease in handling, transporting and rapid dissolution in water. Similar considerations hold for other types of high molecular weight, water-soluble polymers.

Due to a much higher dispersed phase/continuous phase ratio used in a water-in-oil emulsion than the more conventional oil-in-water emulsion and the requirement for good invertibility, the stability of a water-in-oil emulsion containing unreacted monomer is often only marginal. In fact, under the influence of a high shear field, in particular at elevated temperatures, a monomer emulsion can break down quite readily, resulting in an unstable monomer emulsion. Polymerization of such an unstable monomer emulsion would inevitably lead to the formation of gels. Since the breaking down of a monomer emulsion by a shear field, which may result from a circulation pump, or a homogenizer, or a high speed of agitation, is more likely to occur at elevated temperatures, usually near or at the intended polymerization temperature, a stable monomer emulsion must be attained at this stage to prevent reactor fouling.

SUMMARY OF THE INVENTION

It has been discovered that the shear stability of a monomer water-in-oil emulsion is drastically enhanced once a small amount of polymer is formed in the emulsion. In fact, such a monomer emulsion becomes shear-resistant even at elevated temperatures. A stable monomer water-in-oil emulsion can be achieved by initiating the polymerization during the heat-up process using a first, very reactive initiator and once a small amount of polymer is present therein, a stable water-in-oil emulsion results. The polymerization is then completed by using a second, less reactive initiator at the desired reaction temperature.

The present invention therefore, in its broadest aspects, is an improved water-in-oil emulsion polymerization process for preparing a water-in-oil emulsion of a polymer which preferably is linear, of high molecular weight and is water-soluble. The improved process broadly comprises emulsifying one or more water-soluble monomers in an oil phase and polymerizing the monomer(s) therein using two distinct types of polymerization initiators; a first, highly reactive initiator which is capable of polymerizing such monomer(s) at a low temperature and a second, less reactive initiator which is capable of polymerizing the remaining monomer(s) at a higher temperature. The first, highly reactive initiator provides a small amount of polymer in the emulsion and the polymerization is then completed by the action of the second, less reactive initiator. The presence in the monomer, emulsion of a small amount of in situ—formed polymer provides a stable water-in-oil monomer emulsion that is no longer shear sensitive, thereby offering significant process advantages and providing a product polymer water-in-oil emulsion having improved properties.

DESCRIPTION OF THE PREFERRED EMBODIMENTS

The dual initiator polymerization process of the present invention offers a number of important advantages over water-in-oil emulsion polymerization processes taught in the prior art. When only a single polymerization initiator is employed, the polymerization may be troublesome because of the occurrence of any one of the following problems: If the initiator is very reactive, the rate of polymerization may become too fast to be controlled safely. Furthermore, under such reaction conditions, the risk of chain branching or even cross-linking is greatly increased which may lead to products of inferior performance characteristics, especially where linear polymers are preferred or necessary. On the other hand, if a moderately reactive initiator is employed, one runs the risk of fouling the reactor due to breaking down of the monomer emulsion as the result of shear degeneration at elevated temperatures.

For entirely different purposes, polymerizations using two catalyts are described in the prior art. For example, U.S. Pat. No. 3,284,393 discloses a water-in-oil emulsion polymerization process including the use of a mixture of benzoyl and lauroyl peroxides for achieving polymers of higher solution viscosities. U.S. Pat. No. 3,414,547 describes a method of reducing unreacted monomer in the finished product by adding a second initiator after at least 50% of polymer conversion has taken place.

The process of the present invention is expected to be useful for the polymerization of any monomer(s) which may be polymerized by water-in-oil emulsion polymerization since all water-in-oil emulsions of such monomers are shear-sensitive. For example, water-in-oil emulsion polymerization may be employed to homopolymerize and interpolymerize one or more of the following monomers: acrylic and methacrylic acid; acrylic and methacrylic acid salts of the formula

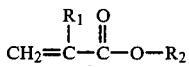

wherein $R_1$ is a hydrogen atom or a methyl group; and $R_2$ is a hydrogen atom, an alkali metal atom (e.g., sodium, potassium), an ammonium group, an organoammonium group of the formula $(R_3)(R_4)(R_5)NH^+$ (where $R_3$, $R_4$ and $R_5$ are each a hydrogen atom, an alkyl group having from 1 to 3 carbon atoms, or a hydroxyalkyl group having from 1 to 3 carbon atoms, such as triethanolamine; acrylamide and methacrylamide and derivatives thereof including acrylamido- and methacrylamido monomers of the formula:

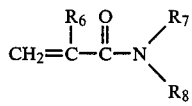

wherein $R_6$ is a hydrogen atom or a methyl group; $R_7$ is a hydrogen atom, a methyl group or an ethyl group; $R_8$ is a hydrogen atom, a methyl group, an ethyl group or $-R_9-SO_3X$, wherein $R_9$ is a divalent hydrocarbon group (e.g., alkylene, phenylene, cycloalkylene) having from 1 to 13 carbon atoms, preferably an alkylene group having from 2 to 8 carbon atoms, a cycloalkylene group having from 6 to 8 carbon atoms, or phenylene, most preferably

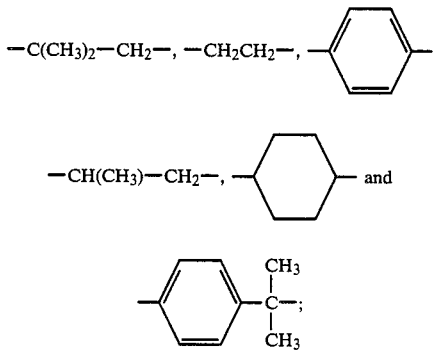

X is a monovalent cation such as a hydrogen atom, an alkali metal atom (e.g., sodium, potassium), an ammonium group, etc.; vinyl sulfonates such as sodium vinyl sulfonate; olefinic dicarboxylic acids such as maleic acid; and the like.

Specific examples of water-soluble monomers which may be homopolymerized or interpolymerized by the process of the present invention are acrylic and methacrylic acid; salts thereof such as sodium acrylate and ammonium acrylate; acrylamide and methacrylamide; aminoalkyl- and dialkylaminoalkyl- acrylates and -methacrylates such as dimethylaminoethyl methacrylate; acrylamido- and methacrylamido- sulfonic acids and sulfonates such as 2-acrylamido-2-methylpropanesulfonic acid (available from the Lubrizol Corporation under its tradename, and hereinafter referred to as, "AMPS"), sodium "AMPS", ammonium "AMPS", organoammonium "AMPS". These water-soluble monomers may be interpolymerized with a minor amount (i.e., less than about 20 mole %, preferably less than about 10 mole %) of one or more hydrophobic vinyl monomers to impart certain desirable properties to the resulting polymer; i.e. vinyl monomers of the formula

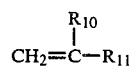

wherein $R_{10}$ is a hydrogen atom or a methyl group and $R_{11}$ is

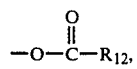

a halogen atom (e.g., chlorine), $-O-R_{13}$ or

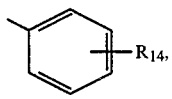

wherein $R_{12}$ is an alkyl group having from 1 to 8 carbon atoms, $R_{13}$ is an alkyl group having from 1 to 6 carbon atoms, preferably 2-4 carbon atoms, $R_{14}$ is a hydrogen atom, a methyl group, an ethyl group, or a halogen atom (e.g., chlorine), preferably a hydrogen atom or a methyl group. Specific examples of suitable copolymerizable hydrophobic vinyl monomers are alkyl esters of acrylic and methacrylic acids such as methyl acrylate, methyl methacrylate, ethyl acrylate, ethyl methacrylate, butyl acrylate, isobutyl acrylate, dodecyl acrylate, 2-ethylhexyl acrylate, etc.; vinyl esters such as vinyl acetate, vinyl propionate, vinyl butyrate, etc.; vinylbenzenes such as styrene, alpha-methyl styrene, vinyl toluene; vinyl ethers such as propyl vinyl ether, butyl vinyl ether, isobutyl vinyl ether, methyl vinyl ether, ethyl vinyl ether, etc.; vinyl halides such as vinyl chloride, vinylidene chloride, etc.; and the like.

The preferred water-soluble monomers are acrylamide, "AMPS" and sodium "AMPS", sodium acrylate, and ammonium acrylate. The preferred hydrophobic monomers are vinyl acetate, ethyl acrylate, styrene and methyl methacrylate. As stated above, the process of this invention may be used to prepare homopolymers or interpolymers of monomers which may be polymerized by water-in-oil emulsion polymerization, such as the monomers exemplified above. By "interpolymers" is meant copolymers of two of such monomers, terpolymers of three of such monomers, tetrapolymers of four of such monomers, and higher polymers if desired. The number of different monomers employed in the polymerization process is not critical and may be varied depending upon the particular polymer desired. The process of the present invention is especially useful for the preparation of anionic, linear, high molecular weight polymers useful as flocculants in treating, for example waste mineral processing streams, and therefore the process will be described in detail below with respect to such polymers merely as a matter of convenience. It is to be expressly understood that the process of the present invention is not limited to preparing only such types of polymers; rather, it is the intention that any monomer capable of polymerization by water-in-oil emulsion polymerization may be polymerized by the process of this invention.

Broadly, the process of the present invention comprises the steps of forming a water-in-oil emulsion of at least one monomer (normally, a water-soluble monomer) from the combination of an aqueous phase comprising an aqueous solution containing at least one such monomer and an oil phase comprising a mixture of a hydrophobic liquid and an oil-soluble surfactant. If it is desired to include a hydrophobic monomer into the polymer being polymerized, one or more hydrophobic monomers may be incorporated into the oil phase, the mixture of the hydrophobic liquid and oil-soluble surfactant.

The combined aqueous and oil phases may be homogenized to form a water-in-oil emulsion containing the water-soluble monomer(s), the hydrophobic liquid, any hydrophobic monomer(s), water and the oil-soluble surfactant. The resulting monomer water-in-oil emulsion is preferably deoxygenated and thereafter the monomers are polymerized. The polymerization may be initiated by adding a first, highly reactive free radical type of initiator, capable of polymerizing the monomers at low temperature, to the monomer water-in-oil emulsion and heating the resulting emulsion/initiator combination to a low temperature sufficient to initiate polymerization of the monomers. Once, or before, a small amount of polymer is formed therein, a second, less reactive free radical polymerization initiator, capable of polymerizing the monomers at a higher temperature, may be added to the reaction system and the polymerization may then be continued and completed to form a water-in-oil emulsion of the resulting polymer. The polymer water-in-oil emulsion may be recovered and the polymer itself may be recovered should that be desirable. Alternatively, an inverting surfactant may be added to the polymer water-in-oil emulsion to invert the emulsion on contact with water.

In the first step of the process, an aqueous phase which comprises an aqueous solution containing at least one water-soluble monomer is prepared. The number of monomers contained in the aqueous solution is not critical and any combination of any water-soluble monomer having a water-solubility of at least about 50 weight percent may be employed. The aqueous solution may be prepared by conventional techniques and may contain the monomers in any concentration, for example, from about 10 to about 75 weight percent, based upon the weight of the aqueous solution. If the water-soluble monomers include acids, for example, acrylic acid or "AMPS", it may be convenient to first react the acid with a suitable base, preferably with an equivalent amount of base, such as sodium hydroxide, to provide, e.g., a sodium salt solution having a pH from about 5 to about 11, preferably from about 6 to about 10, depending upon the type and amount of base employed. The preferred base is sodium hydroxide. Any additional water-soluble monomers may then be added to the resulting salt solution to provide the aqueous solution to be combined with the hydrophobic liquid-containing mixture.

The oil phase, to be combined with the foregoing aqueous phase, generally comprises a mixture of a hydrophobic liquid and an oil-soluble surfactant and, optionally, one or more hydrophobic monomers.

The particular hydrophobic liquid is not critical. Examples of suitable hydrophobic liquids for use herein include benzene, xylene, toluene, mineral oils, kerosenes, petroleum, and mixtures thereof. A preferred hydrophobic liquid is an aliphatic hydrocarbon available from the Exxon Chemical Co. under its tradename Isopar M.

The hydrophobic monomer(s) which may be added to the oil phase may be any hydrophobic monomer which has a solubility in water of less than about 10 weight percent and includes, for example, one or more of vinyl esters such as vinyl acetate, vinyl propionate, vinyl butyrate, etc.; alkyl acrylates such as ethyl acrylate, butyl acrylate, isobutyl acrylate, dodecyl acrylate, 2-ethylhexyl acrylate, etc.; alkyl methacrylates such as methyl methacrylate; vinyl ethers such as methyl vinyl ether, ethyl vinyl ether, butyl vinyl ether, propyl vinyl ether, isobutyl vinyl ether, etc.; acrylonitrile; styrene and its derivatives, such as alpha-methylstyrene; vinyl halides such as vinyl chloride, vinylidene chloride, etc.; N-vinyl carbazole; and the like.

The particular oil-soluble surfactant is not critical. Examples of suitable oil-soluble surfactants for use in the oil phase are those of the oil-soluble type having a Hydrophile-Lipophile Balance (HLB) value of from about 1 to about 10, preferably from about 2 to about 6. These surfactants may be referred to as the water-in-oil type. The suitable surfactants include fatty acid esters, such as sorbitan monolaurate, sorbitan monostearate, sorbitan monooleate (such as that available from I.C.I. under its tradename Span 80), sorbitan trioleate, etc.; mono- and diglycerides, such as mono- and diglycerides obtained from the glycerolysis of edible fats; polyoxyethylenated fatty acid esters, such as polyoxyethylenated (4) sorbitan monostearate; polyoxyethylenated linear alcohols, such as Tergitol 15-S-3 and Tergitol 25-L-3 (both supplied by Union Carbide Corp.); polyoxyethylene sorbitol esters, such as polyoxyethylene sorbitol beeswax derivative; polyoxyethylenated alcohols such as polyoxyethylenated (2) cetyl ether, and the like.

The oil phase may contain any convenient amount of hydrophobic monomer, depending upon the particular monomer and the desired content of such monomers in the final polymer product. Similarly, the amount of oil-soluble surfactant in the oil phase is not critical and generally is that amount sufficient to form the resulting monomer water-in-oil emulsion when the oil phase is blended with the foregoing aqueous phase. However, generally speaking, the oil phase contains from about 1 to about 10 weight percent of the surfactant, based on the total weight of the oil phase. The amount of hydrophobic liquid in the oil phase is generally on the order of from about 70 to about 99 weight percent, based on the total weight of the oil phase.

The oil phase is then blended or combined with the foregoing aqueous phase and the resulting mixture may be homogenized to form a water-in-oil emulsion containing the monomer(s) to be polymerized. Homogenization takes place by subjecting the mixture to high shear mixture techniques and using equipment which are generally well-known in the art. These include the use of homogenizers, high speed mixers and any other techniques for obtaining high shear mixing. The homogenization generally is carried out at a temperature of from about 10° to about 30° C., preferably about 15° to 25° C. The homogenization may be carried out either continuously or in a batch process.

The water-in-oil emulsions so prepared normally have a rather narrow particle size distribution. The diameters of the majority of the particles may range from about 0.2 to about 5 microns.

The resulting monomer water-in-oil emulsion comprises:

(a) an aqueous phase constituting from about 50 to about 80, preferably from about 60 to about 78, weight percent of the total emulsion and containing the water-soluble monomer(s) wherein the monomers constitute from about 20 to about 80, preferably from about 25 to about 50, weight percent of the total aqueous phase;

(b) an oil phase constituting from about 15 to about 45, preferably from about 20 to about 40, weight percent of the total emulsion and containing a hydrophobic liquid and, optionally, from about 0.1 to about 20, preferably from about 1 to about 10, weight percent, based on the weight of the oil phase, of one or more hydrophobic monomers; and (c) an oil-soluble surfactant constituting from about 0.1 to about 5, preferably from about 1 to about 3, weight percent of the total emulsion.

After forming the monomer water-in-oil emulsion, either during or after addition to a reactor, it is generally deoxygenated, by for example, subjecting part or all of the emulsion to a vacuum of from about 50 to about 500, preferably from about 100 to about 200, mm of mercury under an inert gas atmosphere at a temperature of from about 0° to about 30° C., either continuously or as a batch process.

A first, highly reactive initiator useful in polymerizing ethylenically unsaturated monomers is then added to the reactor. Any free radical initiator which is capable of initiating the polymerization at a temperature less than about 45° C. (e.g. 0°–45° C.), preferably between about 20° to 40° C., can be used as the first initiator. Examples of such initiators are shown below in Table I:

TABLE I

| Initiator | $t_{\frac{1}{2}}$ (T °C.)* |
|---|---|
| 2,2'-azobis-(2-cyclopropylpropionitrile) | 5.5 (44.2) |
| 2,2'-azobis-(2,4-dimethyl-4-methoxyvaleronitrile) | 10 (33) |
| 2,2'-azobis-(1-cyclooctanenitrile) | 3.6 (36.6) |
| 1,1'-azobis-3-chlorocumene | 7.8 (42.8) |
| 1,1'-azobis-4-chlorocumene | 17 (36) |
| 2,2'-azobis-2-(4-tolyl)propane | 11.8 (42.8) |
| phenyl-azo-triphenylmethane | 3.4 (43.3) |
| 1,1'-azo-bis-1-(4-tolyl) cyclohexane | 9.5 (43.8) |
| 3-tolyl-azo-triphenylmethane | 2.6 (42.8) |
| isobutyryl peroxide | 0.8 (40) |
| alpha-chloropropionyl-m-chlorobenzoyl peroxide | 12.7 (41) |
| cyclopropane acetyl peroxide | 0.19 (25) |
| benzoyl isobutyryl peroxide | 0.47 (41) |
| m-chlorobenzoyl isobutyl peroxide | 5.5 (40) |
| p-nitrobenzoyl isobutyryl peroxide | 2.4 (40) |
| cyclopentane formyl peroxide | 12.8 (40) |
| cyclohexane formyl peroxide | 1.3 (35) |
| 2-iodobenzoyl-4-nitrobenzoyl peroxide | 3.4 (25) |
| 2-nitrobenzoyl peroxide | 10.8 (25) |
| benzoyl phenylacetyl peroxide | 0.9 (25) |
| phenyl acetyl peroxide | 0.4 (20) |
| Benzoyl-2-[trans-2-(phenyl)vinyl]benzoyl peroxide | 2 (35) |
| cis-4-tert-butylcyclohexane formyl peroxide | 11.4 (40) |
| t-butyl-hydroperoxide/cobalt 2-ethyl hexanoate | 0.18 (25) |
| t-butyl-hydroperoxide/cobalt stearate | 0.14 (45) |
| dimethyl peroxalate | 11.3 (25) |
| di-isopropyl peroxalate | 3.2 (35) |
| di-(tert-butylperoxy)oxalate | 2.8 (35) |
| di-tert-butyl-peroxalate | 1.9 (38) |
| tert-butyl-2-(methylthio)perbenzoate | 7.4 (39) |
| tert-butyl-2-(phenylthio)perbenzoate | 1.6 (40) |
| tert-butyl-triphenyl peracetate | 0.25 (35) |
| p-toluenesulfonyl-p-tolylsulfone | 1.3 (39) |

*$t_{\frac{1}{2}}$ = half-life of initiator, in hours, at the indicated temperature The first initiator may be added to the reactor either directly or in the form of a solution, i.e., the initiator is dissolved in a suitable solvent, such as a hydrocarbon liquid, e.g., toluene. The initiator solution typically contains the initiator in an amount of from about 0.1 to about 10, preferably from about 0.5 to about 5, weight percent. Preferably, all of the first initiator is initially added to the reactor containing the monomer water-in-oil emulsion.

The polymerization is then initiated by heating to a temperature of from about 30° to about 60° C., preferably from about 40° to about 50° C. until a small amount of polymer is formed therein and a shear-stable emulsion is obtained. The specific amount of polymer formed is not critical, as long as a shear-stable emulsion is obtained, and will depend upon the specific first initiator employed, the reactivity of the monomers being polymerized, the temperature of polymerization, the time during which the monomer water-in-oil emulsion is subjected to heating in the presence of the first initiator, etc. Generally speaking, it is desirable and it is therefore preferred that this initial polymerization be conducted at a temperature and for a period of time necessary to obtain a shear-stable emulsion, so that the polymerization can be completed using the second, less reactive initiator at higher temperatures. The amount of polymer necessary to obtain a shear-stable emulsion will necessarily depend upon the monomers being polymerized, the molecular weight of the resulting polymer, the temperature of polymerization, the amount of shear which the emulsion experiences during polymerization, etc. Those skilled in the art should be capable of determining the necessary amount of polymer to be formed for a given system to provide a shear-stable emulsion. As a general guideline to assist those skilled in the art to more easily practice the present invention, for a monomer water-in-oil emulsion system which contains 50 to 60 mole percent acrylamide monomer, 1 to 10 mole percent vinyl acetate monomer and 30 to 49 mole percent sodium acrylate monomer, all based upon the total monomers, this initial polymerization is conducted under necessary conditions to obtain from about 1 to about 5 percent, based on the total emulsion, of polymer therein. This level of polymer for this particular combination of monomers produces a shear-stable emulsion. The amount of polymer may be determined using suitable conventional techniques, such as a coagulation test.

The initial polymerization is generally and preferably performed at atmospheric pressure, although sub-atmospheric or super-atmospheric pressures may be used. In addition, the initial polymerization is also preferably carried out under an inert atmosphere, such as a helium, argon or nitrogen atmosphere.

Generally, the second initiator may be any free radical initiator capable of initiating polymerization of ethylenically-unsaturated monomers at a temperature greater than 40° C., desirably between about 40° and 100° C., preferably between about 45° to 80° C. Examples of such initiators are shown in Table II below.

TABLE II

| Initiator | $t_{\frac{1}{2}}$ (T °C.)* |
|---|---|
| 2,2'-azobis-(2,4-dimethylvaleronitrile) | 10 (52) |
| 2,2'-azobis-(isobutyronitrile) | 10 (64) |
| 2,2'-azobis-2,4,4-trimethylvaleronitrile | 16 (40) |
| 2,2'-azobis-2-methylbutyronitrile | 8.4 (69.8) |
| 2,2'-azobis-2-ethylpropionitrile | 2.3 (80) |
| 1,1'-azobis-1-cyclopentane nitrile | 2.6 (80) |
| 2,2'-azobis-2,3-dimethylbutyronitrile | 7.4 (69.8) |

TABLE II-continued

| Initiator | $t_{\frac{1}{2}}$ (T °C.)* |
|---|---|
| 2,2'-azobis-2-methylvaleronitrile | 4.6 (69.8) |
| 2,2'-azobis-2-cyclobutylpropionitrile | 1.3 (80.5) |
| 1,1'-azobis-1-cyclohexanenitrile | 23 (80) |
| 2,2'-azobis-2-propyl-butyronitrile | 0.75 (80) |
| 2,2'-azobis-2,3,3-trimethylbutyronitrile | 2.6 (80) |
| 2,2'-azobis-2-methylhexylonitrile | 1.2 (80) |
| 2,2'-azobis-2-isopropylbutyronitrile | 1.9 (80.5) |
| 1,1'-azobis-1-cycloheptanenitrile | 2.0 (59) |
| 1,1'-azobis-1-(2-methylcyclohexane)-nitrile | 26 (80) |
| 1,1'-azobis-1-cyclohexanecarbonitrile | 41 (80) |
| 2,2'-azobis-2-isopropyl-3-methylbutyronitrile | 1.5 (80.5) |
| 2,2'-azobis-2-benzylpropionitrile | 1.7 (80) |
| 2,2'-azobis-2-(4-chlorobenzyl)propionitrile | 2.2 (80) |
| 2,2'-azobis-2-(4-nitrobenzyl)propionitrile | 1.9 (80) |
| 1,1'-azobis-1-cyclodecanenitrile | 3.6 (51) |
| azo-bis-isobutyramidine | 27 (60) |
| 2,2'-azobis-methyl-2-methylpropionate | 1.2 (80) |
| azobis-(N,N'—dimethyleneisobutyramidine) | 17.6 (60) |
| azobis-(1-carbomethoxy-3-methylpropane) | 42 (55) |
| 2,2'-azobis-(ethyl-2-methylpropionate) | 4.6 (70) |
| 1,1'-azobis-1-chloro-1-phenylethane | 0.22 (75) |
| 1,1'-azobis-1-chloro-1-(4-bromophenyl)ethane | 1.1 (59) |
| 3,7'-diphenyl-1,2-diaza-1-cycloheptene | 5.1 (61) |
| 1,1'-azo-bis-cumene | 1 (59) |
| 3-bromophenyl-azo-triphenylmethane | 1.7 (54) |
| 2,4-dinitrophenyl-azo-9-phenylfluorene | 0.9 (56) |
| 1-hydroxybutyl-n-butyl peroxide | 11 (79) |
| acetyl peroxide | 61 (55) |
| propionyl peroxide | 10 (65) |
| 2-iodopropionyl peroxide | 0.9 (56) |
| butyryl peroxide | 8.6 (65) |
| beta-allyloxypropionyl peroxide | 9.6 (70) |
| benzoyl peroxide | 14 (70) |
| 2-chlorobenzyl peroxide | 6.1 (80) |
| 2,4-dichlorobenzoyl peroxide | 18 (50) |
| cyclohexane acetyl peroxide | 15 (65) |
| decanoyl peroxide | 12 (60) |
| 4-benzylidenebutyryl peroxide | 8 (50) |
| lauroyl peroxide | 6.7 (70) |
| ethyl-tert-butyl peroxalate | 4.3 (45) |
| tert-butyl perpivalate | 1.5 (70) |
| tert-butyl phenylperacetate | 6.4 (78) |
| potassium persulfate | 61 (60) |

*$t_{\frac{1}{2}}$ = half-life of initiator, in hours, at the indicated temperature The second, less reactive initiator is normally an initiator which polymerizes ethylenically-unsaturated monomers at a temperature higher than the temperature at which the first, highly reactive initiator polymerizes such monomers; preferably these temperatures differ by at least about 5° C.; most preferably, the first, highly reactive initiator reaches a given $t_{\frac{1}{2}}$ (as defined above), in hours, at a temperature which is about 20° C. less than the temperature at which the second, less reactive initiator reaches that same $t_{\frac{1}{2}}$.

The polymerization reaction generates considerable heat which must be removed. For example, when one of the monomers being polymerized is acrylamide, due to the very fast rate of its polymerization (about $8 \times 10^{-3}$ moles/liter.sec. at 50° C.) and its high heat of polymerization (about—20 Kcal/mole), an enormous amount of heat is realized during the polymerization which must be dissipated properly to avoid the occurrence of a runaway exotherm. The heat-removing capability of a conventional reactor equipped with either a cooling jacket or cooling coils, or both, may be inadequate for the purpose of controlling this polymerization. Consequently, the rate of heat evolution; i.e., the rate of polymerization, must be significantly reduced to accommodate the limited cooling capacity which may result in long batch times.

A more effective method for heat removal is the use of an external heat exchanger connected to the reactor through a closed loop. The reaction mixture may be circulated through the heat exchanger by a pump during the course of polymerization. Due to the fact that the process of the present invention provides a shear-stable water-in-oil emulsion, such as external heat exchanger may be employed in the present invention. Under ordinary conditions, without the improvement afforded by the present invention, under the shear field generated by a high flow capacity pump, the stability of a conventional monomer emulsion is so marginal that such an operation cannot be carried out with any reasonable degree of reliability. In fact, emulsion breakdown often takes place at the early stages of polymerization leading to the formation of either coarse emulsion particles or gelation. Any conventional heat apparatus may be used to provide the external heat exchange loop which may be used in the present invention. It is preferred to employ such an external heat exchanger in the process of the present invention so as to afford the maximum removal or dissipation of the heat generated during polymerization. The advantages of the instant invention should be obtained, however, regardless of the mechanical design of the reactor system employed.

The polymerization reaction rate may be controlled by the introduction of small quantities of air (atmospheric air and/or oxygen) into the reaction. The air may be introduced, i.e., sparged, either intermittently or continuously into the reactor to control the reaction temperature. When a continuous air sparging is employed, the amount of oxygen in the reaction medium must be carefully controlled so as to achieve the desired rate of polymerization. An oxygen content of from about 0.01 to about 1.0, preferably from about 0.02 to about 0.50, parts per million is desirable. When the air is introduced intermittently, a flow rate of from about 0.01 to about 1.0, preferably from about 0.05 to about 0.5, cubic inches per minute, per pound of reactor charge is desirable. The duration of air injection may vary from a fraction of a second to a few seconds, and it may be repeated as many times as necessary until a desired rate of polymerization is achieved.

After the polymerization is complete, an antioxidant may be added to the reaction mass. Any organic antioxidant suitable for the inhibition of free radical reactions may be used. The antioxidant is generally first dissolved in a suitable solvent. The preferred antioxidants include substituted phenols (such as that available from Shell under its tradename Ionol), thiobisphenol (such as that available from Monsanto under its tradename Santonox-R), and hydroquinone derivatives, such as the monomethyl ether of hydroquinone. The suitable solvents include toluene, benzene, xylene, diethyl ether, methyl acetate, and the like. The antioxidant may be present in the antioxidant solution in amounts of from about 0.1 to about 10, preferably from about 1 to about 5 weight percent.

The antioxidant solution is added to the reaction mass in amounts of from about 0.05 to about 5 parts per hundred parts of polymer. Addition of the antioxidant may be commenced either at the end of the polymerization or after the reaction mixture has been cooled to ambient temperature.

The reaction mass is generally cooled to about 25° C. and the polymer water-in-oil emulsion recovered.

The resulting polymer water-in-oil emulsion generally comprises:

(a) an aqueous phase comprising from about 50 to about 80, preferably from about 60 to about 78, weight percent of the total emulsion and containing therein from about 20 to about 80, preferably from about 25 to about 60, weight percent of polymer, based on the total weight of aqueous phase;

(b) a hydrophobic liquid constituting from about 15 to about 50, preferably from about 20 to about 40, weight percent of the total emulsion, and (c) an oil-soluble surfactant constituting from about 0.1 to about 5, preferably from about 1 to about 3, weight percent of the total emulsion.

After the polymer water-in-oil emulsion is prepared, a water-soluble inverting surfactant may be added thereto. The surfactants which may be used include polyoxyethylene alkyl phenol; polyoxyethylene (10 mole) cetyl ether; polyoxyethylene alkyl-aryl ether; quaternary ammonium derivatives; potassium oleate; N-cetyl-N-ethyl morpholinium ethosulfate; sodium lauryl sulfate; condensation products of higher fatty alcohols with ethylene oxide, such as the reaction product of oleyl alcohol with 10 ethylene oxide units; condensation products of alkylphenols and ethylene oxide, such as the reaction products of isooctylphenol with 12 ethylene oxide units; condensation products of higher fatty acid amines with five, or more, ethylene oxide units; ethylene oxide condensation products of polyhydric alcohol partial higher fatty esters, and their inner anhydrides (e.g., mannitol anhydride, called Mannitan, and sorbitol-anhydride, called Sorbitan). The preferred surfactants are ethoxylated nonyl phenols, ethoxylated nonyl phenol formaldehyde resins, and the like.

The inverting surfactant may be used in amounts of from about 0.1 to about 20, preferably from about 1 to about 10, parts by weight per one hundred parts by weight of the polymer.

The water-in-oil emulsion containing the inverting surfactant is inverted in the presence of water releasing the polymer into the water in a very short period of time.

The solubilized polymer may then be used, for example, as a flocculant in treating mineral processing streams such as phosphate slimes or coal blackwater suspensions. For use as a flocculant, the water solution may contain from about 0.001 to about 0.3, preferably from about 0.01 to about 0.1, weight percent polymer.

The polymers prepared by the process of the present invention may be, for example, those described in commonly-assigned, copending U.S. patent application Ser. No. 302,110, filed Sept. 14, 1981, now U.S. Pat. No. 4,529,782 (Fan et al.) the disclosure of which is hereby expressly incorporated herein by reference. The polymers disclosed therein are preferably of the following general formula:

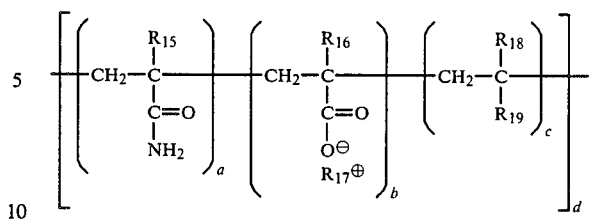

wherein $R_{15}$, $R_{16}$ and $R_{18}$ are independently hydrogen or methyl; $R_{17}^+$ is an alkali metal ion, such as $Na^+$ or $K^+$; $R_{19}$ is $—OR_{20}$ (where $R_{20}$ is an alkyl group having up to 5 carbon atoms),

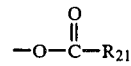

(where $R_{21}$ is either methyl or ethyl),

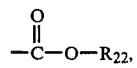

(where $R_{22}$ is an alkyl group having up to 8 carbon atoms), phenyl, methyl-substituted phenyl, CN, or

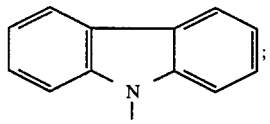

wherein a is from about 5 to about 90 mole percent, preferably from about 30 to about 60 mole percent, b is from about 5 to about 90, preferably from about 30 to about 60 mole percent, c is from about 0.2 to about 20 mole percent, preferably from about 1 to about 10 mole percent, with the proviso that a+b+c equals 100 mole percent, and d is an integer of from about 100,000 to about 500,000. Under certain conditions, the alkoxy or acyloxy groups in the polymer may be partially hydrolyzed to the corresponding alcohol group and yield a tetrapolymer of the following general formula:

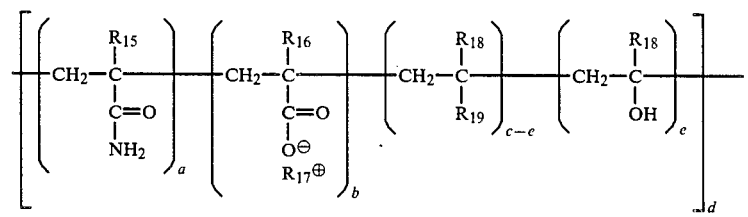

wherein $R_{15}$, $R_{16}$, $R_{17}^+$, $R_{18}$, $R_{19}$, a, b, c and d are as previously defined and e is from about 0.1 to less than about 20 mole percent and wherein a+b+(c−e)+e=100 mole %.

The most preferred polymers disclosed in said Serial No. 302,110 are terpolymers of the following formula:

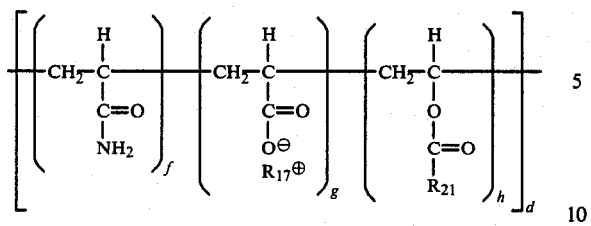

wherein $R_{17}^+$ is $Na^+$ or $K^+$, $R_{21}$ is methyl, ethyl or butyl, and f is from about 5 to about 90, preferably from about 30 to about 60 mole percent, g is from about 5 to 90, preferably from about 30 to 60 mole percent, h is from about 0.2 to about 20 mole percent, with the proviso that f+g+h equals 100 mole percent and d is as previously defined.

The most preferred tetrapolymers disclosed in said Ser. No. 302,110 are of the following formula:

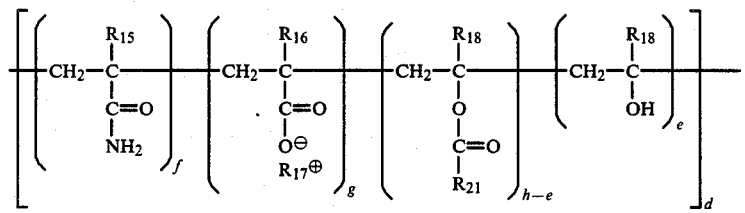

wherein $R_{15}$, $R_{16}$, $R_{17}^+$, $R_{18}$, $R_{21}$, f, g, h, d and e are as previously defined.

However, for purposes of the present invention, the most preferred polymers are those disclosed in a commonly-assigned, copending U.S. patent application Ser. No. 474,602, filed Mar. 11, 1983, now abandoned and refiled Sept. 18, 1985 as Ser. No. 777,458, now U.S. Pat. No. 4,559,390, entitled HIGH MOLECULAR WEIGHT WATER-SOLUBLE POLYMERS AND FLOCCULATION METHOD USING SAME, the disclosure of which is hereby expressly incorporated herein by reference, and represented by the following formula:

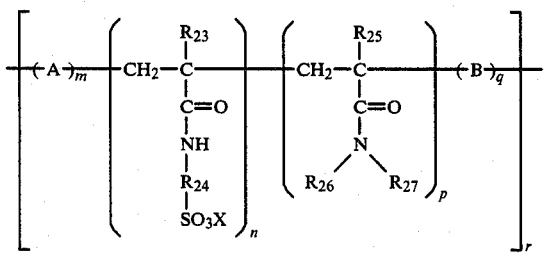

wherein A represents a repeating unit derived from a hydrophobic vinyl monomer having a water-solubility of less than about 5 weight %; $R_{23}$ and $R_{25}$ are each a hydrogen atom or a methyl group; $R_{26}$ and $R_{27}$ are each a hydrogen atom, a methyl group or an ethyl group; $R_{24}$ represents a divalent hydrocarbon group having from 2 to 13 carbon atoms; X represents a monovalent cation; B represents a repeating unit derived from an ethylenically-unsaturated carboxylic acid or a salt thereof; m is about 0.1–10 mole %, n is about 1–40 mole %, p is about 20–98.9 mole %, and q is about 0–40 mole %, with the proviso that m+n+p+q=100 mole %; and r is a large positive integer (e.g., such that the polymer molecular weight is greater than 500,000, preferably greater than 1,000,000).

Among these polymers are terpolymers represented by the following formula:

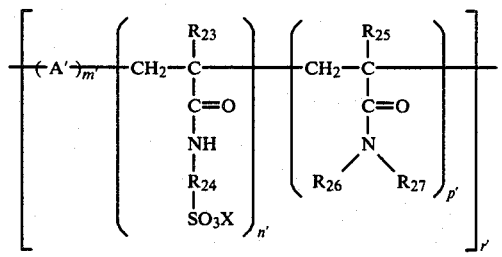

wherein
(1) A' represents a repeating unit derived from a hydrophobic vinyl monomer having a water-solubility of less than about 5 weight percent such as monomeric repeating units represented by the formula

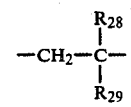

wherein $R_{28}$ is —H or —$CH_3$; $R_{29}$ is

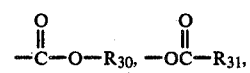

a halogen atom (e.g., chlorine), —O—$R_{32}$, —CN or

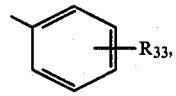

wherein $R_{30}$ is an alkyl group having from 1 to 12 carbon atoms, preferably from 1 to 4 carbon atoms, most preferably a butyl group, $R_{31}$ is an alkyl group having from 1 to 4 carbon atoms, preferably a methyl group; $R_{32}$ is an alkyl group having from 1 to 6 carbon atoms, preferably 2 to 4 carbon atoms; and $R_{33}$ is a hydrogen atom, a methyl group or an ethyl group, preferably a hydrogen atom or a methyl group. Examples of preferred hydrophobic vinyl monomers include vinyl acetate, styrene, acrylonitrile, alpha-methyl styrene, ethyl acrylate, methyl acrylate, ethyl methacrylate, methyl methacrylate, butyl acrylate, isobutyl acrylate, dodecyl acrylate, 2-ethylhexylacrylate, vinyl propionate, vinyl butyrate, propyl vinyl ether, butyl vinyl ether, isobutyl vinyl ether, vinyl chloride, vinylidene chloride, etc.

(2) $R_{23}$ and $R_{25}$ are each a hydrogen atom or a methyl group although it is preferred that both be a hydrogen atom;

(3) $R_{24}$ is a divalent hydrocarbon group having from 2 to 13 carbon atoms, such as alkylene groups having from 2 to 8 carbon atoms, cycloalkylene groups having from 6 to 8 carbon atoms, phenylene, and the like. Preferred divalent hydrocarbon groups include —C(CH$_3$-

)$_2$—CH$_2$—,

—CH$_2$CH$_2$—, —CH$_2$CH$_2$CH$_2$—, —CH$_2$CH$_2$CH$_2$CH$_2$—,

—CH(CH$_3$)—CH$_2$—, and

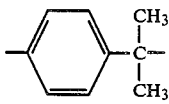

The most preferred $R_{24}$ grouping is —C(CH$_3$)$_2$—CH$_2$— which forms sodium "AMPS" when $R_{23}$=hydrogen and X is sodium;

(4) X is a monovalent cation such as a hydrogen atom, an ammonium group, an organoammonium group, an alkali metal atom (e.g., Na or K), and the like. The most preferred cation is a sodium atom;

(5) $R_{26}$ and $R_{27}$ are each a hydrogen atom, a methyl group or an ethyl group although it is preferred that both be hydrogen atoms;

(6) m' is about 0.1–10 mole %, preferably about 0.2–5 mole %;

(7) n' is about 1–40 mole %, preferably about 5–20 mole %;

(8) p' is about 50–98.9 mole %, preferably about 75–95 mole %;

(9) m'+n'+p'=100 mole %; and

(10) r' is a large positive integer to provide a polymer molecular weight of greater than 500,000 and preferably greater than 1,000,000.

Some of the acetoxy or alkoxy groups of $R_{29}$ (i.e., the

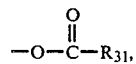

or —O—$R_{32}$ groups, respectively) may be hydrolyzed, resulting in a tetrapolymer which may be represented by the formula:

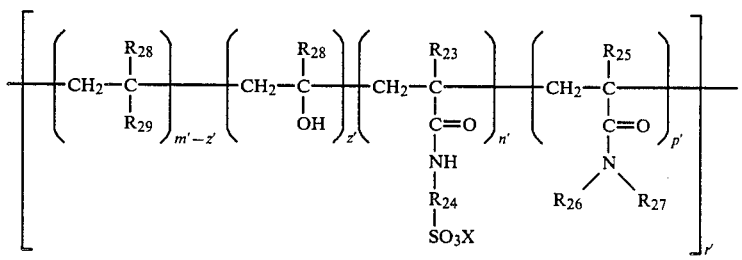

wherein $R_{23}$, $R_{24}$, $R_{25}$, $R_{26}$, $R_{27}$, $R_{28}$, $R_{29}$, X, m', n', p' and r are as defined above, and z' is from about 0.1 to less than about 10 mole % and wherein (m'−z')+z'+n'+p'=100 mole %.

Alternatively, instead of defining the terpolymer repeating units as in (6)–(8) above, the terpolymer and its hydrolyzed derivative may be defined as that resulting from the polymerization of a water-in-oil monomer emulsion containing from about 0.1–20 mole %, preferably 0.2–10 mole % of monomer A', about 1–40 mole %, preferably about 5–20 mole %, of the SO$_3$X-containing monomer, and about 50–98.9 mole %, preferably about 75–95 mole %, of monomer

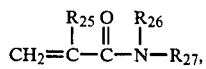

all based on the total moles of monomer in the emulsion.

The most preferred terpolymer is that resulting from the polymerization of a water-in-oil monomer emulsion containing about 8–12 mole % of sodium "AMPS" monomer, about 87–91 mole % of acrylamide monomer, and about 1–5 mole % of vinyl acetate monomer. These terpolymers are especially useful in flocculating phosphate slimes.

Also among the polymers disclosed in the above-identified application filed on even data herewith are tetrapolymers of the following formula:

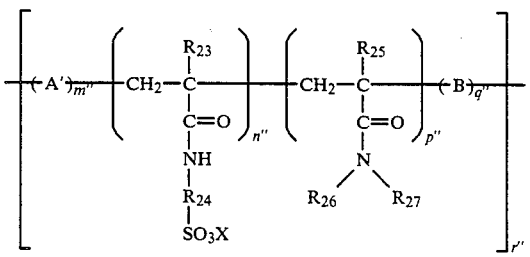

wherein A', $R_{23}$, $R_{24}$, $R_{25}$, $R_{26}$ and $R_{27}$ have the same meaning as above; wherein m'', n'', and R'' have the same meaning as m', n', and r', respectively, defined above; and wherein (1) p'' is about 20–96.9 mole %, preferably about 40–86.9 mole %;

(2) q″ is greater than 0 and up to about 40 mole %, preferably about 10-30 mole %;

(3) B represents a repeating unit derived from an ethylenically-unsaturated monomer containing a carboxylic acid group such as acrylic acid, methacrylic acid, maleic acid, and the like, and salts thereof with alkali metals (e.g., sodium, potassium, etc.), ammonia (i.e., ammonium salts) and organic amines (e.g., ammonium salts represented by the formula $(R_{34})(R_{35})(R_{36})NH^+$ wherein $R_{34}$, $R_{35}$ and $R_{36}$ are each a hydrogen atom, an alkyl group having from 1 to 3 carbon atoms, or a hydroxyalkyl group having from 1 to 3 carbon atoms, such as a trimethylammonium group, a triethanolammonium group, etc.). The preferred B monomer is sodium acrylate.

Some of the acetoxy or alkoxy groups of the hydrophobic monomer A' may be hydrolyzed, resulting in a pentapolymer which may be represented by the formula:

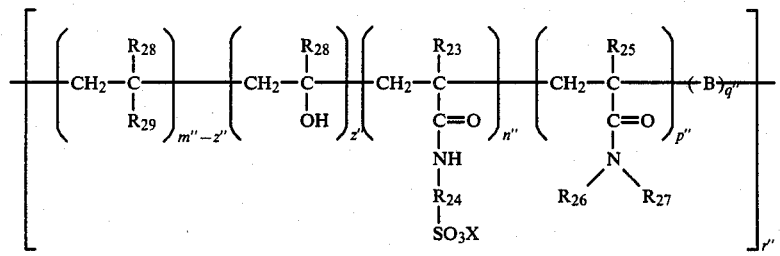

wherein $R_{23}$, $R_{24}$, $R_{25}$, $R_{26}$, $R_{27}$, $R_{28}$, $R_{29}$, X, m″, n″, p″ and r″ are as defined above, and z″ is from about 0.1 to less than about 10 mole % and wherein $(m″-z″)+z″+n″+p″=100$ mole %;

Alternatively, instead of defining the tetrapolymer repeating units as above, the tetrapolymer (and its hydrolyzed derivative) may be defined as that resulting from the polymerization of a water-in-oil monomer emulsion containing from about 0.1-20 mole %, preferably 0.2-10 mole % of monomer A', about 1-40 mole %, preferably about 5-20 mole %, of the SO₃X-containing monomer, about 20-96.9 mole %, preferably about 40-86.9 mole %, of monomer

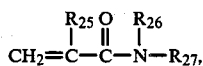

and greater than 0 to about 40 mole %, preferably about 10-30 mole %, of monomer "B", all based on the total moles of monomer in the emulsion.

The most preferred tetrapolymer is that resulting from the polymerization of a water-in-oil monomer emulsion containing about 50-70 mole % of acrylamide monomer, about 6-10 mole % of sodium "AMPS" monomer, about 1-5 mole % vinyl acetate monomer and about 20-40 mole % of sodium acrylate monomer. Such tetrapolymers are especially useful in the flocculation of coal blackwater suspensions.

Polymerization of a water-in-oil monomer emulsion by the process of the present invention is superior to those processes mentioned in the prior art in many respects, including:

(1) The monomer emulsion is stabilized at the onset of the polymerization. It will not be degenerated by subsequent shearing and heating during the course of the polymerization.

(2) Product uniformity is greatly improved due to a quick fixing of the particle size at the beginning of the polymerization.

(3) Any tendency toward gel formation is minimized which significantly increases the reactor output by reducing the frequency for cleaning the reactor between batches.

(4) The improved monomer emulsion stability permits a greater flexibility in process design and a broader operating latitude; resulting in improved process safety and productivity.

The present invention is illustrated sometimes by comparison with prior art processes, by the following examples which describe work that was actually performed. These examples are meant to be illustrative only and are not intended to limit the invention thereby; rather, it is the intention that the invention be limited only by the scope of the claims appended hereto.

EXAMPLE 1

A sodium acrylate solution was prepared by neutralizing an acrylic acid solution (containing 237.3 g of acrylic acid and 278.55 g. of deionized water) with about 332.25 g of a 48 weight % sodium hydroxide solution to a pH of 7.5. It was then combined with 308.55 g of crystalline acrylamide, 378 g of deionized water, and 0.09 g of sodium ethylenediamine tetraacetate (EDTA sodium salt) to give a homogeneous solution. An oil solution was prepared separately by dissolving 28.38 g of sorbitan monooleate (available from I.C.I. under its tradename Span-80) and 31.92 g. of vinyl acetate into 509.25 g. of an aliphatic hydrocarbon (available from Exxon Chemical Co. under its tradename Isopar-M). The resulting oil and aqueous solutions were combined and homogenized in a Waring blender to yield a uniform water-in-oil emulsion having a Brookfield viscosity of 790 centipoises (cps) (Model HBT, 10 RPM at 25° C.).

The above monomer emulsion was transferred to a 3-liter, Pyrex glass reaction kettle, equipped with a turbine agitator, thermometer, condenser, addition funnel, gas inlet and outlet, and an external bath for either heating or cooling purposes. The monomer emulsion was deaerated by sparging with nitrogen at room temperature for about 45 minutes. Thereafter, an initiator solution containing 0.029 g. of 2,2'-azobis-2(2,4-dimethyl-4-methoxyvaleronitrile) (available from the Du Pont Company under its tradename VAZO-33) in 1.4 g. of toluene was quickly introduced. The reaction mixture was heated to about 40° C. when a rapid exotherm began to take place. The reaction mixture was heated adiabatically until the temperature reached about 52° C., at which point a second initiator solution containing 0.234 g. 2,2'azobis-(2,4-dimethylvaleronitrile) (available from the Du Pont Company under its tradename VAZO-52) in 11.27 g. of toluene was added through the addition funnel at a rate of 1.9 g per every 10 min. The resulting exotherm lasted for about an hour and during this period the polymerization temperature was maintained at 52±2° C. through external cooling and occasional air sparging. A nitrogen flow was maintained throughout the polymerization. After two additional hours of post heating the reactor was cooled to room temperature and an inhibitor solution containing 0.585 g. of thiobisphenol (available from the Monsanto Co. under its tradename Santonox-R) in 15 g. of toluene was added. The product was a milky, white, water-in-oil emulsion. The Brookfield viscosity of the emulsion was determined to be 1340 cps (Model HBT, 10 RPM at 25° C.). The resultant polymer was found to possess an intrinsic viscosity of 32.9 dl/g. in 1N NaCl solution.

EXAMPLE 2

The product prepared in Example 1 was dissolved in water with the aid of a small amount of a nonylphenol ethoxylate (10.5 moles of ethylene oxide) (available from Union Carbide Corporation under its tradename Tergitol NP-10) surfactant, by mixing 2.03 g. of the polymer emulsion with 0.03 g of Tergitol NP-10 and a sufficient amount of deionized water to a total volume of 200 ml. After mixing, a viscous solution was obtained which possessed the following Brookfield viscosities:
3,040 centipoises (Model HBT, 10 RPM, at 25° C.)
39,800 centipoises (Model LVT, 0.6 RPM, at 25° C.)

EXAMPLE 3

Example 1 was repeated with the exception that an aqueous solution of Acrylamide-50 (an acrylamide aqueous solution containing 50 weight percent actives) was substituted for the crystalline acrylamide and the total amount of deionized water charge was reduced so that the water phase/oil phase ratio remained identical in both preparations. Furthermore, the EDTA sodium salt was replaced with 0.218 g of pentasodium salt of diethylene triamine pentaacetic acid (available from Dow Chemical Co. under its tradename Versenex-80). The resultant polymer emulsion exhibited a Brookfield viscosity of 1,400 centipoises. The polymer possessed an intrinsic viscosity of 23.1 dl/g in 1N NaCl solution. An 0.3 weight percent solution of the polymer, prepared as in Example 2, showed the following Brookfield viscosities.
2,910 centipoises (Model HBT, 10 RPM, at 25° C.)
36,750 centipoises (Model LVT, 0.6 RPM, at 25° C.)

EXAMPLES 4–7

Example 3 was repeated with the exception that changes were made in initiators charged, amount of Versenex-80 used, and in polymerization temperature employed. These changes together with some characterizations of the finished products are compiled in Table III below. In all cases, gel-free polymer emulsions were obtained:

TABLE III

| Example No. | Initiator Charge (ppm) | | Versenex-80 Charge (ppm/ppm Cu++) | Reaction T (°C.) | 0.3% Solution Viscosity (cps) | | I.V. (dl/g) |
|---|---|---|---|---|---|---|---|
| | VAZO-33 | VAZO-52 | | | HBT | LVT | |
| 4 | 13.5 | 108 | 25 | 52 | 2,050 | 20,000 | 17.0 |
| 5 | 13.5 | 108 | 0 | 52 | 1,630 | 11,300 | 13.1 |
| 6 | 27 | 216 | 37.5 | 55 | 2,690 | 29,500 | 24.3 |
| 7 | 27 | 216 | 25 | 55 | 2,210 | 23,500 | 18.3 |

EXAMPLES 8–12

Example 3 was repeated with the exception that an ion-exchanged solution of acrylamide (Acrylamide-50 treated by with a Rohm and Haas IR-20 ion exchange resin) was employed and no chelating agent was employed in these preparations. Other changes and the properties of the resulting polymer are described in Table IV below. In all preparations, highly uniform, gel-free polymer emulsions were obtained:

TABLE IV

| Example No. | Initiator Charge (ppm) | | Maximum Exotherm T (°C.) | 0.3% Solution Viscosity (cps) | | I.V. (dl/g) |
|---|---|---|---|---|---|---|
| | VAZO-33 | VAZO-52 | | HBT | LVT | |
| 8 | 3.3 | 160 | 52 | 2,400 | 24,500 | 22.6 |
| 9 | 6.8 | 133 | 48 | 2,040 | 17,130 | 16.7 |
| 10 | 14 | 130 | 53 | 2,430 | 24,000 | 18.7 |
| 11 | 27 | 136 | 55 | 2,430 | 25,500 | 22.4 |
| 12 | 54 | 217 | 57 | 2,340 | 21,750 | 20.7 |

EXAMPLES 13–28

Example 3 was repeated with the exception that a solution of acrylamide-50 was employed. Other changes in formulations and polymerization conditions, and the properties of the resulting polymers, are shown in Table V below. All preparations resulted in highly uniform, gel-free products.

TABLE V

| Example No. | Initiator Charge (ppm) | | Versenex-80 Charge (ppm/ppm Cu++) | Reaction T (°C.) | 0.3% Solution Viscosity (cps) | | I.V. (dl/g) |
|---|---|---|---|---|---|---|---|
| | VAZO-33 | VAZO-52 | | | HBT | LVT | |
| 13 | 6.75 | 108 | 28 | 56 | 3,520 | 44,500 | 24.9 |
| 14 | 33.75 | 216 | 14 | 52 | 2,180 | 17,200 | 16.9 |
| 15 | 6.75 | 216 | 14 | 56 | 2,110 | 16,300 | 16.9 |
| 16 | 6.75 | 108 | 14 | 52 | 1,950 | 14,300 | 16.2 |
| 17 | 33.75 | 216 | 28 | 56 | 3,460 | 38,500 | 26.1 |
| 18 | 33.75 | 108 | 28 | 52 | 3,330 | 43,100 | 28.5 |
| 19 | 6.75 | 216 | 28 | 52 | 3,590 | 43,650 | 26.4 |
| 20 | 33.75 | 108 | 14 | 56 | 2,210 | 15,630 | 16.5 |
| 21 | 33.75 | 108 | 14 | 52 | 2,110 | 16,700 | 16.3 |
| 22 | 33.75 | 216 | 14 | 56 | 2,050 | 14,630 | 16.0 |

TABLE V-continued

| Example No. | Initiator Charge (ppm) VAZO-33 | Initiator Charge (ppm) VAZO-52 | Versenex-80 Charge (ppm/ppm Cu++) | Reaction T (°C.) | 0.3% Solution Viscosity (cps) HBT | 0.3% Solution Viscosity (cps) LVT | I.V. (dl/g) |
| --- | --- | --- | --- | --- | --- | --- | --- |
| 23 | 6.75 | 216 | 28 | 56 | 2,390 | 43,250 | 23.9 |
| 24 | 33.75 | 216 | 28 | 52 | 2,980 | 30,700 | 24.5 |
| 25 | 33.75 | 108 | 28 | 56 | 3,040 | 26,500 | 21.4 |
| 26 | 6.75 | 216 | 14 | 52 | 2,110 | 17,200 | 17.2 |
| 27 | 6.75 | 108 | 28 | 52 | 3,520 | 45,250 | 25.5 |
| 28 | 6.75 | 108 | 14 | 56 | 1,950 | 14,700 | 16.3 |

EXAMPLE 29

A aqueous solution and an oil solution prepared according to Example 4 were used in a series of shear rate and emulsion viscosity studies. The two phases were contained and blended in a variable speed Waring blender. Beginning from speed setting no. 1, the two phases were blended successively at each of the six speed settings for a period of 3 minutes and the resultant emulsion viscosities measured at 25° C. Separately, portions of the same aqueous and oil solutions were blended by a normal laboratory procedure to yield a monomer emulsion having a Brookfield viscosity of 670 centipoises. The monomer emulsion was polymerized using a dual-initiator system consisting of 13.5 and 40.5 ppm of VAZO-33 and VAZO-52, respectively.

Once the reaction mixture reached 50° C., the polymerization was quenched by air sparging and an external ice bath. An inhibitor solution containing Santonox-R and toluene was added. Using an isopropyl alcohol coagulation test, it was found that the quenched monomer emulsion had about 2% polymer conversion. The quenched monomer emulsion was then subjected to the same shear rate vs viscosity tests described above. The results are shown in Table VI below.

TABLE VI

| Blender Speed Setting | Brookfield Viscosity (HBT, 10 RPM at 25° C.) (Centipoises) Freshly Prepared Monomer Emulsion | Brookfield Viscosity (HBT, 10 RPM at 25° C.) (Centipoises) Quenched Monomer Emulsion |
| --- | --- | --- |
| 1 | 470 | 990 |
| 2 | 850 | 970 |
| 3 | 1,165 | 990 |
| 4 | 890 | 960 |
| 5 | 235 | 950 |
| 6 | 175 | 920 |

The viscosity of the freshly prepared monomer emulsion was highly sensitive to shear. With increasing blending speeds, the monomer emulsion viscosity went through a maximum and then fell precipitously to a very low value. At this point, the monomer emulsion became very unstable. A phase separation usually occurred. The polymerization of an unstable monomer emulsion usually leads to a gel-contaminated, unsatisfactory product. Occasionally, total gelation of the batch resulted.

On the other hand, the quenched monomer emulsion which contained 2% of polymer exhibited a surprisingly good shear stability over the entire blender speed range. Not only did it withstand the high shear fields without breaking down, its viscosity was quite constant throughout the entire range. Since the emulsion viscosity of a water-in-oil emulsion is usually a measure of particle size and particle distribution, the results strongly suggest that redistribution in particle size would no longer take place once a few percent of polymer conversion has been effected. This is accomplished by the unique dual-initiator polymerization process of this invention.

EXAMPLE 30

This example illustrates another unique feature of this invention; namely, that the polymer must be produced in situ to permit a satisfactory polymerization. Attempts to stabilize the monomer emulsion by introducing an external high molecular weight, water-soluble polymer prior to the emulsification, would hinder the ability to produce a satisfactory emulsion. An aqueous solution and an oil solution similar to those described in Example 3 were prepared. A polymer sample recovered from Example 8 was added to the aqueous phase to produce a concentration of 0.0018 weight percent. The polymer-doped aqueous solution and the oil solution were blended with a Waring blender. Emulsification was no longer possible using a variety of blending conditions. In all cases, phase separation occurred rapidly.

EXAMPLE 31

An aqueous solution containing 106.97 g of Lubrizol 2405 (a 50% aqueous solution of 2-acrylamido-2-methylpropane sulfonic acid sodium salt), 239.8 g of Acrylamide-50, 0.207 g of Versenex-80 and 157.11 g of deionized water was mixed vigorously in a Waring blender with an oil solution containing 165.58 g of Isopar-M, 9.46 g of Span-80 and 1.6 g of vinyl acetate. The resulting water-in-oil monomer emulsion exhibited a Brookfield viscosity of 1,190 centipoises (Model HBT at 10 RPM at 25° C.). The monomer emulsion was transferred to a one-liter Pyrex-glass polymerization kettle equipped with a turbine agitator, a thermometer, a condenser, an addition funnel and a nitrogen (air) inlet and outlet. The reactor was deaerated by sparging with nitrogen at a rate of 400 ml/min, for a period of about 45 minutes. Thereafter, two solutions one consisting of 0.01 of sodium bisulfite in 2 ml of deionized water and the other containing 0.01 g of potassium persulfate in deionized water were introduced consecutively. An exotherm took place immediately. About 5 minutes after the initial exotherm, a toluene solution containing 0.148 of VAZO-52 in 7.51 g of toluene was added during a period of about one hour. The polymerization temperature was maintained at about 50° C. by means of an external cooling bath and air injection. The polymerization was complete in about 3 hours and a solution of 0.164 g of Santonox-R in 5 g of toluene was introduced before discharing the product. The resultant produce was a uniform water-in-oil emulsion which possessed a Brookfield viscosity of 1,330 centipoises (Model HBT at 10 RPM at 25° C.). The recovered polymer was found to have a 0.3 weight % solution viscosity of 9,800 centipoises (Model LVT at 0.6 RPM at 25° C.).

EXAMPLE 32 (PRIOR ART)

Example 31 was repeated with the exception that the amounts of sodium bisulfite and potassium persulfate were increased from 0.01 to 0.316 and 0.079 g, respectively. The polymerization was allowed to proceed for a period of about 85 minutes before the addition of the VAZO-52 solution. Consequently, about 50% of polymer conversion had taken place at the point of the VAZO-52 addition. The polymerization was allowed to continue for an additional 3 hours. The resultant polymer emulsion was nonuniform and contained a noticeable amount of gel particles. The Brookfield viscosities of the polymer emulsion and the 0.3% polymer solution were 680 and 2,200 centipoises, respectively (measured as in Example 31). The aqueous solution contained visible insoluble polymeric particles.

EXAMPLE 33

Example 1 was repeated with the exception that the VAZO-33 solution was replaced with a redox system consisting of two solutions, one containing 0.03 g of sodium bisulfite in 6 g of deionized water and the other containing 0.03 g of potassium persulfate in 6 g of deionized water. The exotherm took place at about 25° C. upon the addition of the redox initiator system. About 30 minutes after the initial exotherm, the VAZO-52 solution was added and the exotherm continued for a period of about 100 minutes. After 2 hours of post-heating, a solution of 0.585 g of Santonox-R in 15 g of toluene was introduced before discharging the product. A uniform water-in-oil polymer emulsion was obtained. It possessed a Brookfield viscosity of 1,190 centipoises (Model HBT at 10 RPM at 25° C.). The recovered polymer exhibited a 0.3 weight % solution viscosity of 28,000 centipoises (Model LVT at 0.6 RPM at 25° C.).

What is claimed is:

1. A process for producing water-in-oil emulsions of a polymer from at least one ethylenically-unsaturated monomer comprising the steps of
   (a) forming an aqueous phase comprising an aqueous solution containing at least one ethylenically-unsaturated, water-soluble monomer;
   (b) forming an oil phase comprising a hydrophobic liquid and an oil-soluble surfactant;
   (c) blending said aqueous phase and oil phase to form a water-in-oil emulsion of said monomer;
   (d) initiating polymerization of said monomer in said emulsion by heating said emulsion in the presence of a first polymerization initiator capable of initiating polymerization of said monomer at a temperature less than about 45° C.; and
   (e) after a small amount of polymer is formed sufficient to provide a shear-stable monomer emulsion, completing said polymerization in the presence of a second polymerization initiator capable of initiating polymerization of said monomer at a second temperature which is both higher than about 40° C. and higher than said first temperature.

2. The process of claim 1 wherein said first initiator comprises a free-radical initiator capable of polymerizing said monomer at a temperature of from about 0° to about 45° C.

3. The process of claim 1 wherein said second initiator comprises a free-radical initiator capable of polymerizing said monomer at a temperature of from about 40° to about 100° C.

4. The process of claim 1 wherein said oil phase also contains at least one hydrophobic monomer having a water solubility of less than about 10 weight percent.

5. The process of claim 4 wherein said hydrophobic monomer is selected from the group consisting of vinyl esters, alkyl acrylates, alkyl methacrylates, vinyl ethers, acrylonitrile, styrene, N-vinyl carbazole, and vinyl halides.

6. The process of claim 1 wherein said monomer is selected from the group consisting of acrylic and methacrylic acids and salts thereof; acrylamide; methacrylamide; and acrylamido-and methacrylamido monomers of the formula

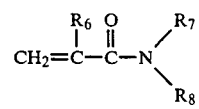

wherein $R_6$ is a hydrogen atom or a methyl group; $R_7$ is a hydrogen atom or an alkyl group having from 1 to 2 carbon atoms; $R_8$ is an alkyl group having from 1 to 2 carbon atoms or $-R_9-SO_3X$ wherein $R_9$ is a divalent hydrocarbon group having from 2 to 13 carbon atoms and X is a monovalent cation.

7. The process of claim 1 wherein said hydropholic liquid is selected from the group consisting of benzene, xylene, toluene, mineral oils, kerosenes, petroleum and mixtures thereof.

8. The process of claim 1 wherein said oil-soluble surfactant has a Hydrophile-Lipophile Balance (HLB) of from about 1 to about 10.

9. The process of claim 1 wherein said second temperature is higher than said first temperature by at least about 5° C.

10. The process of claim 1 wherein said first initiator attains a half-life at a temperature which is at least about 20° C. less than the temperature at which said second initiator attains the same half-life.

11. The process of claim 1 wherein said polymer is represented by the following formula:

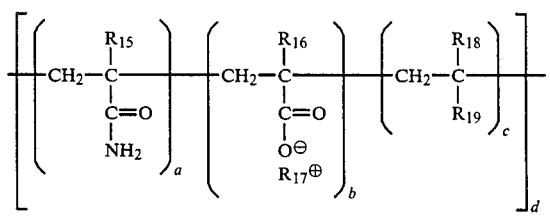

wherein $R_{15}$, $R_{16}$, and $R_{18}$ are each a hydrogen atom or a methyl group; $R_{17}^+$ is an alkali metal atom or an ammonium group, $R_{19}$ is $-OR_{20}$,

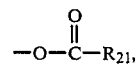

phenyl, substituted phenyl, $-CN$,

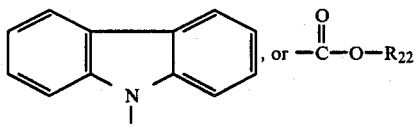

wherein $R_{20}$ is an alkyl group having up to 5 carbon atoms; wherein $R_{21}$ is a methyl or ethyl group, and wherein $R_{22}$ is an alkyl group having up to 8 carbon atoms; a is from about 5 to about 90 mole %, b is from about 5 to about 90 mole %, c is from about 0.2 to about 20 mole % with the proviso that $a+b+c=100$ mole %; and d is an integer of from about 1,000 to about 500,000.

12. The process of claim 11 wherein said polymer is a terpolymer represented by the formula:

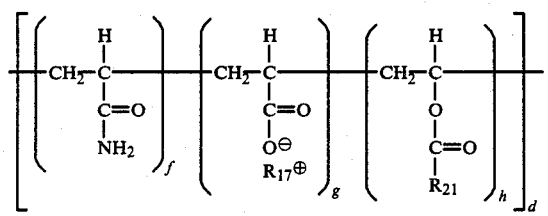

wherein $R_{17}+$ is $Na+$, or $K+$ or $NH_4+$; $R_{21}$ is a methyl, ethyl or butyl group; f is from about 30 to about 60 mole %, g is from about 30 to about 60 mole % and h is from about 0.2 to about 20 mole %, with the proviso that $f+g+h=100$ mole %.

13. The process of claim 11 wherein said polymer is represented by the following formula:

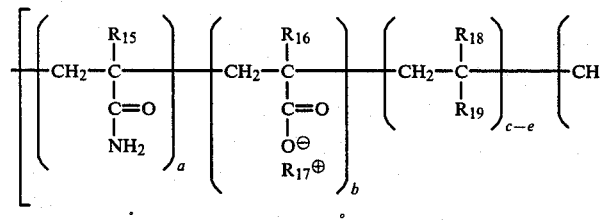

wherein $R_{15}$, $R_{16}$, $R_{17}+$, $R_{18}$, $R_{19}$, a, b, c and d are as defined in claim 11; wherein e is from about 0.1 to less than about 20 mole % and with the proviso $a+b+(c-e)+e=100$ mole %.

14. The process of claim 13 wherein said polymer is represented by the formula:

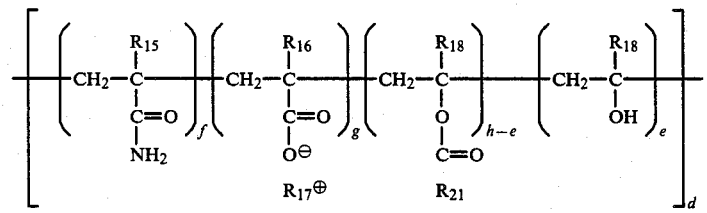

wherein $R_{15}$, $R_{16}$, $R_{17}+$, $R_{18}$, $R_{21}$, d and e are as defined in claim 13; wherein f is from about 30 to about 60 mole %, g is from about 30 to about 60 mole % and h is from about 0.2 to about 20 mole %, with the proviso that $f+g+(h-e)+e=100$ mole %.

15. The process of claim 1 wherein said polymer is represented by the formula

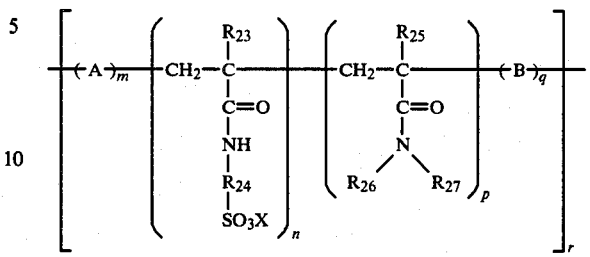

wherein A represents a repeating unit derived from a hydrophobic vinyl monomer having a water-solubility of less than about 5 weight percent; $R_{23}$ and $R_{25}$ are each a hydrogen atom or a methyl group; $R_{26}$ and $R_{27}$ are each a hydrogen atom, a methyl group or an ethyl group; $R_{24}$ represents a divalent hydrocarbon group having from 2 to 13 carbon atoms; X represents a monovalent cation; B represents a repeating unit derived from an ethylenically-unsaturated carboxylic acid or a salt thereof; m is from about 0.1 to 10 mole %, n is from about 1 to 40 mole %, p is from about 20 to 98.9 mole % and q is 0 to about 40 mole %, with the proviso that $m+n+p+q=100$ mole %; and r is a large positive integer.

16. The process of claim 15 wherein said polymer is a terpolymer represented by the formula:

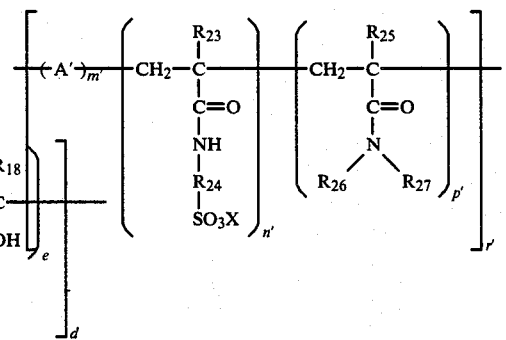

wherein A' represents

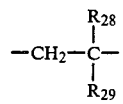

wherein $R_{28}$ is —H or —$CH_3$ and $R_{29}$ is

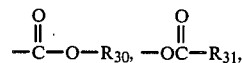

a halogen atom, —O—$R_{32}$, —CN or

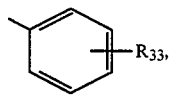

wherein $R_{30}$ is an alkyl group having from 1 to 12 carbon atoms, $R_{31}$ is an alkyl group having from 1 to 4 carbon atoms, $R_{32}$ is an alkyl group having from 1 to 6 carbon atoms, and $R_{33}$ is a hydrogen atom, a methyl group or an ethyl group; $R_{24}$ is an alkylene group having from 2 to 8 carbon atoms, a cycloalkylene group having from 6 to 8 carbon atoms or phenylene; $R_{25}$, $R_{26}$ and $R_{27}$ are as defined in claim 15; X is a hydrogen atom, an ammonium group, an organo-ammonium group or an alkali metal atom, m' and n' are the same as m and n, respectively, and p' is from about 50 to 98.9 mole %, wherein m'+n'+p'=100 mole %; and wherein r' is a large positive integer such that the molecular weight of the polymer is greater than 500,000.

17. The process of claim 16 wherein said polymer is represented by the following formula:

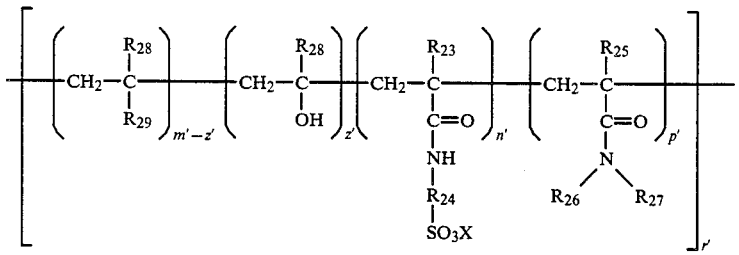

wherein $R_{23}$, $R_{24}$, $R_{25}$, $R_{26}$, $R_{27}$, $R_{28}$, $R_{29}$, X, m', n', p', and r' are as defined in claim 16, and wherein z' is from about 0.1 to less than about 10 mole % and wherein (m'−z')+n'+p'+z'=100 mole %.

18. The process of claim 16 wherein said terpolymer comprises a polymer resulting from the polymerization of a water-in-oil monomer emulsion containing about 8-12 mole % sodium-2-acrylamido-2-methylpropane sulfonate monomer, about 87-91 mole % acrylamide monomer and about 1-5 mole % of vinyl acetate monomer.

19. The process of claim 15 wherein said polymer is a tetrapolymer represented by the formula:

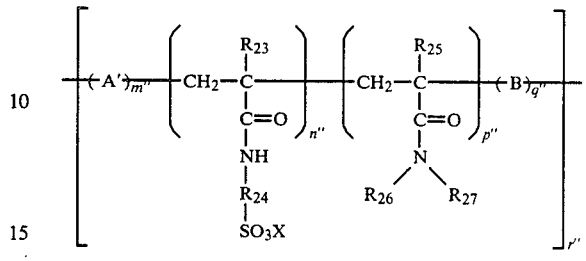

wherein A', $R_{23}$, $R_{24}$, $R_{25}$, $R_{26}$ and $R_{27}$ are as defined in claim 15; wherein m'', n'' and r'' have the same meaning as m, n and r, respectively; wherein p'' is from about 20 to 96.9 mole %; wherein q'' is greater than 0 and up to about 40 mole %, with the proviso that m''+n''+p''+q''=100 mole %; and wherein B represents a repeating unit derived from a member selected from the group consisting of acrylic and methacrylic acids, maleic acid, and alkali metal salts thereof.

20. The process of claim 19 wherein said tetrapolymer is hydrolyzed and is represented by the following formula:

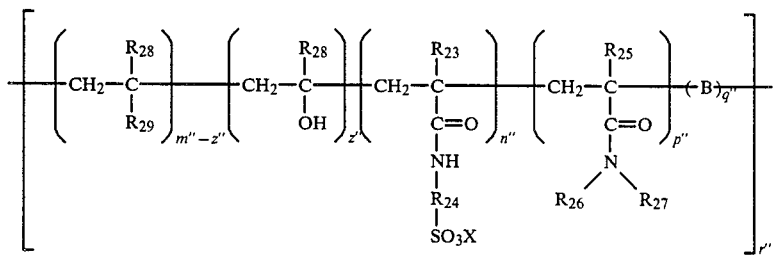

wherein $R_{23}$, $R_{24}$, $R_{25}$, $R_{26}$, $R_{27}$, $R_{28}$, $R_{29}$, X, B, m'', n'', p'', q'' and r'' are as defined in claim 19; and wherein z'' is from about 0.1 to less than about 10 mole %, with the proviso that (m''−z'')+n''+p''+q''+z''=100 mole %.

21. The process of claim 19 wherein said tetrapolymer comprises a polymer resulting from the polymerization of a water-in-oil monomer emulsion containing about 6-10 mole % of sodium-2-acrylamido-2-methylpropane sulfonate monomer, about 50-70 mole % of acrylamide monomer, about 1-5 mole % of vinyl acetate monomer and about 20-40 mole % of sodium acrylate monomer.

22. The process of claim 1 wherein said first initiator reaches a given half-life, $t_{\frac{1}{2}}$, in hours, at a temperature less than the temperature at which said second initiator reaches that same half-life.

23. The process of claim 22 wherein the difference in temperature at which said first and second initiators reach a half-life is at least about 5° C.

24. The process of claim 22 wherein the difference in temperature at which said first and second initiators reach a half-life is at least about 20°.

25. The process of claim 1 wherein the amount of polymer formed which is sufficient to provide for a shear-stable emulsion is up to about 5 weight percent of the total emulsion.

26. The process of claim 25 wherein the amount of polymer formed which is sufficient to provide for a shear-stable emulsion is from about 1 to about 5 weight percent of the total emulsion.

27. The process of claim 1 wherein said first polymerization initiator is one or more initiators selected from the group consisting of: 2,2'-azobis-(2-cyclopropylpropionitrile), 2,2'-azobis-(2,4-dimethyl-4-methoxyvaleronitrile), 2,2'-azobis-(1-cyclooctanenitrile), 1,1'-azobis-3-chlorocumene, 1,1'-azobis-4-chlorocumene, 2,2'-azobis-2-(4-tolyl)propane, phenyl-azo-triphenylmethane, 1,1'-azo-bis-1-(4-tolyl)cyclohexane, 3-tolyl-azo-triphenylmethane, isobutyryl peroxide, alpha-chloropropionyl-m-chlorobenzoyl peroxide, cyclopropane acetyl peroxide, benzoyl isobutyryl peroxide, m-chlorobenzoyl isobutyl peroxide, p-nitrobenzoyl isobutyryl peroxide, cyclopentane formyl peroxide, cyclohexane formyl peroxide, 2-iodobenzoyl-4-nitrobenzoyl peroxide, 2-nitrobenzoyl peroxide, benzoyl phenylacetyl peroxide, phenyl acetyl peroxide, benzoyl-[trans-2-(phenyl)vinyl]benzoyl peroxide, cis-4-tert-butylcyclohexane formyl peroxide, t-butyl-hydroperoxide/cobalt 2-ethyl hexanoate, t-butyl-hydroperoxide/cobalt stearate, dimethyl peroxalate, di-isopropyl peroxalate, di-(tert-butylperoxy)oxalate, di-tert-butyl-peroxalate, tert-butyl-2-(methylthio)perbenzoate, tert-butyl-2-(phenylthio)perbenzoate, tert-butyltriphenyl peracetate and p-toluenesulfonyl-p-tolysulfone.

28. The process of claim 1 wherein said second polymerization initiator is one or more initiators selected from the group consisting of: 2,2'-azobis-(2,4-dimethylvaleronitrile), 2,2'-azobis(isobutyronitrile), 2,2'-azobis-2,4,4-trimethylvaleronitrile, 2,2'-azobis-2-methylbutyronitrile, 2,2'-azobis-2-ethylpropionitrile, 1,1'-azobis-1-cyclopentane nitrile, 2,2'-azobis-2,3-dimethylbutyronitrile, 2,2'-azobis-2-methylvaleronitrile, 2,2'-azobis-2-cyclobutylpropionitrile, 1,1'-azobis-1-cyclohexanenitrile, 2,2'-azobis-2-propylbutyronitrile, 2,2'-azobis-2,3,3-trimethylbutyronitrile, 2,2'-azobis-2-methylhexylonitrile, 2,2'-azobis-2-isopropylbutyronitrile, 1,1'-azobis-1-cycloheptanenitrile, 1,1'-azobis-1-(2-methylcyclohexane)-nitrile, 1,1'-azobis-1-cyclohexanecarbonitrile, 2,2'-azobis-2-isopropyl-3-methylbutyronitrile, 2,2'-azobis-2-benzylpropionitrile, 2,2'-azobis-2-(4-chlorobenzyl)propionitrile, 2,2'-azobis-2-(4-nitrobenzyl)propionitrile, 1,1'-azobis-1-cyclodecanenitrile, azo-bis-isobutyramidine, 2,2'-azobis-methyl-2-methylpropionate, azobis-(N,N'-dimethyleneisobutyramidine), azobis-(1-carbomethoxy-3-methylpropane), 2,2'-azobis-(ethyl-2-methylpropionate), 1,1'-azobis-1-chloro-1-phenylethane, 1,1'-azobis-1-chloro-1-(4-bromophenyl)ethane, 3,7'-diphenyll-1,2-diaza-1-cycloheptene, 1,1'-azobis-cumene, 3-bromophenyl-azo-triphenylmethane, 2,4-dinitrophenyl-azo-9-phenylfluorene, 1-hydroxybutyl-n-butyl peroxide, acetyl peroxide, propionyl peroxide, 2-iodopropionyl peroxide, butyryl peroxide, beta-allyloxypropionyl peroxide, benzoyl peroxide, 2-chlorobenzyl peroxide, 2,4-dichlorobenzoyl peroxide, cyclohexane acetyl peroxide, decanoyl peroxide, 4-benzylidenebutyryl peroxide, lauroyl peroxide, ethyl-tert-butyl peroxalate, tert-butyl perpivalate, tert-butyl phenylperacetate and potassium persulfate.

29. The process of claim 1 wherein said first initiator is 2,2'-azobis-2(2,4-dimethyl-4methoxyvaleronitrile or potassium persulfate and wherein said second initiator is 2,2'-azobis-(2,4-dimethylvaleronitrile).

* * * * *